US012071016B2

United States Patent
Shapiro et al.

(10) Patent No.: US 12,071,016 B2
(45) Date of Patent: Aug. 27, 2024

(54) TORQUE CONTROL BASED ON GEAR SHIFT

(71) Applicant: Honda Motor Co., Ltd., Tokyo (JP)

(72) Inventors: Andrew G. Shapiro, Columbus, OH (US); Adam H. Vosz, Delaware, OH (US); Eric M. Lott, Marysville, OH (US); Kristian Karpinski, Mountain View, CA (US)

(73) Assignee: Honda Motor Co., Ltd., Tokyo (JP)

( * ) Notice: Subject to any disclaimer, the term of this patent is extended or adjusted under 35 U.S.C. 154(b) by 387 days.

(21) Appl. No.: 17/718,709

(22) Filed: Apr. 12, 2022

(65) Prior Publication Data

US 2023/0322070 A1    Oct. 12, 2023

(51) Int. Cl.
*B60K 5/12* (2006.01)
*F16F 15/00* (2006.01)
*G07C 5/10* (2006.01)

(52) U.S. Cl.
CPC .......... *B60K 5/1283* (2013.01); *F16F 15/002* (2013.01); *G07C 5/10* (2013.01); *F16F 2228/066* (2013.01); *F16F 2230/18* (2013.01)

(58) Field of Classification Search
CPC ............................ B60K 5/1283; F16F 15/002; F16F 2228/066; F16F 2230/18; G07C 5/10
See application file for complete search history.

(56) References Cited

U.S. PATENT DOCUMENTS

| 8,140,230 B2 * | 3/2012 | Haggerty | .............. | B60W 10/06 123/192.1 |
| 8,414,404 B2 | 4/2013 | Takenaka et al. | | |

(Continued)

FOREIGN PATENT DOCUMENTS

| CN | 109424675 A | 3/2019 | | |
| EP | 2939857 A2 * | 11/2015 | ......... | B60G 17/0152 |

(Continued)

OTHER PUBLICATIONS

JP 2015121254 A with English translation. Date filed Dec. 23, 2013. Date published Jul. 2, 2015. (Year: 2015).*

(Continued)

*Primary Examiner* — Calvin Cheung
(74) *Attorney, Agent, or Firm* — Mark E. Duell; American Honda Motor Co., Inc.

(57) ABSTRACT

An apparatus is provided with a dampening unit coupled to an engine. The apparatus further includes a control unit communicably coupled to the dampening unit. The control unit detects a gear shift in a transmission unit associated with the engine. The control unit further determines a dampening duration of the dampening unit at the detected gear shift. The dampening duration corresponds to a time taken for the dampening unit to absorb torsional vibrations of the engine at the detected gear shift. The control unit further compares the determined dampening duration at the detected gear shift with a preset dampening duration at a preset gear shift. The control unit further determines, based on the comparison, a torque control amount for the dampening unit to absorb the torsional vibrations of the engine. The control unit further controls the dampening unit based on the determined torque control amount.

20 Claims, 7 Drawing Sheets

(56) References Cited

U.S. PATENT DOCUMENTS

| | | |
|---|---|---|
| 8,417,427 B2 | 4/2013 | Stridsberg |
| 8,968,150 B2 | 3/2015 | Misu et al. |
| 9,187,090 B2* | 11/2015 | Shiozawa ............. B60W 40/10 |
| 9,309,965 B2 | 4/2016 | Itazu et al. |
| 9,316,265 B2 | 4/2016 | Saiga et al. |
| 10,001,204 B2 | 6/2018 | Mitsubori et al. |
| 10,808,798 B2 | 10/2020 | Mizuguchi et al. |
| 2011/0307150 A1* | 12/2011 | Jiang .................... F16H 61/688 477/77 |
| 2012/0022755 A1* | 1/2012 | Oda ....................... B60W 10/11 701/58 |
| 2014/0172209 A1* | 6/2014 | Ide ...................... B60W 10/184 701/22 |
| 2016/0076634 A1* | 3/2016 | Mitsubori .............. B60K 17/08 74/411 |
| 2017/0159809 A1* | 6/2017 | Nakashima ............ F16H 59/46 |
| 2018/0073454 A1* | 3/2018 | Kono ................... F02D 11/106 |
| 2021/0156453 A1* | 5/2021 | Nakamura ............ F16F 15/002 |
| 2021/0171016 A1* | 6/2021 | Ishiwada ............... B60W 30/20 |
| 2021/0219483 A1 | 7/2021 | Karuppannan et al. |

FOREIGN PATENT DOCUMENTS

| | | |
|---|---|---|
| JP | 2550520 B2 | 11/1996 |
| JP | 4349263 B2 | 10/2009 |
| JP | 4858514 B2 | 1/2012 |
| JP | 5037388 B2 | 9/2012 |
| JP | 2018112234 A | 7/2018 |
| JP | 6447344 B2 | 1/2019 |
| JP | 2021085432 A | 6/2021 |
| WO | 2012066644 A1 | 5/2012 |

OTHER PUBLICATIONS

WO-2013051117-A1 with English translation. Date filed Oct. 5, 2011. Date published Apr. 11, 2013. (Year: 2013).*

KR 20030061179 A with English translation. Date filed Jan. 11, 2002. Date published Jul. 18, 2003. (Year: 2003).*

DE 102013100964 B4 with English translation. Date filed Jan. 30, 2013. Date published Sep. 2, 2021. (Year: 2021).*

* cited by examiner

TORQUE CONTROL BASED ON GEAR SHIFT

BACKGROUND

Vehicles generally include an engine formed from multiple moving components (such as a valve train, a piston, a crankshaft, and the like). Because of the multiple moving components, there may be vibrations that may be generated from the engine. Such vibrations may cause a jerk in the vehicle during a movement (such as an angular movement, or a linear movement) of the vehicle. Additionally, the vibrations may also cause a wobble in the vehicle during an acceleration of the vehicle.

In certain cases, there may be dampers that may be mounted on the engine to reduce the vibrations generated from the engine. The dampers may include resilient members (such as leaf springs or coiled springs) with a fixed torque control amount. The fixed torqued control amount may relate to a fixed amount of dampening torque that may be generated from the resilient members to dampen the vibrations of the engine. In some instances, the vibrations of the engine may vary based on multiple parameters (such as a gear transmission ratio). For example, if the engine is operating at a first gear (such as a minimal speed with a maximum torque), there may be minimal vibrations from the engine. In another example, if the engine is operating at a second gear (such as an increased speed which is higher than the minimal speed, and a reduced torque which is lower than the maximum torque), there may be an increase in vibrations which is higher than the minimal vibrations of the engine. In such cases, as the dampers have the fixed torque control amount, it may be difficult for the dampers to dampen multiple ranges of vibrations.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An exemplary aspect of the disclosure provides an apparatus. The apparatus may include a dampening unit coupled to an engine. The apparatus may further include a control unit communicably coupled to the dampening unit. The control unit may be configured to detect a gear shift in a transmission unit associated with the engine. The control unit may be further configured to determine a dampening duration of the dampening unit at the detected gear shift. The dampening duration may correspond to a time taken for the dampening unit to absorb torsional vibrations of the engine at the detected gear shift. The control unit may be further configured to compare the determined dampening duration at the detected gear shift with a preset dampening duration at a preset gear shift. The control unit may be further configured to determine, based on the comparison, a torque control amount for the dampening unit to absorb the torsional vibrations of the engine. The control unit may be further configured to control the dampening unit based on the determined torque control amount.

Another exemplary aspect of the disclosure provides an apparatus. The apparatus may include a dampening unit coupled to an engine. The apparatus may further include a control unit communicably coupled to the dampening unit. The control unit may be configured to detect a gear shift in a transmission unit associated with the engine. The control unit may be further configured to determine a dampening duration of the dampening unit at the detected gear shift. The dampening duration may correspond to a time taken for the dampening unit to absorb torsional vibrations of the engine at the detected gear shift. The control unit may be further configured to compare the determined dampening duration at the detected gear shift with a preset dampening duration at a preset gear shift. The control unit may be further configured to determine a plurality of control parameters associated with the dampening unit. The control unit may be further configured to determine, based on the comparison and the determined plurality of control parameters, a torque control amount for the dampening unit to absorb the torsional vibrations of the engine. The control unit may be further configured to control the dampening unit based on the determined torque control amount.

Another exemplary aspect of the disclosure provides a method. The method may be executed in a control unit. The method may include detecting a gear shift in a transmission unit associated with an engine. The method may further include determining, at the detected gear shift, a dampening duration of a dampening unit coupled to the engine. The dampening duration may correspond to a time taken for the dampening unit to absorb torsional vibrations of the engine at the detected gear shift. The method may further include comparing the determined dampening duration at the detected gear shift with a preset dampening duration at a preset gear shift. The method may further include determining, based on the comparison, a torque control amount for the dampening unit to absorb the torsional vibrations of the engine. The method may further include controlling the dampening unit based on the determined torque control amount.

This summary is provided to introduce a selection of concepts in a simplified form that is further disclosed in the detailed description of the present disclosure. This summary is not intended to identify key or essential inventive concepts of the claimed subject matter, nor is it intended for determining the scope of the claimed subject matter.

The foregoing summary, as well as the following detailed description of the present disclosure, is better understood when read in conjunction with the appended drawings. To illustrate the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may provide an apparatus that may be configured to detect a gear shift (such as a change in a gear of a transmission unit associated with an engine) and control a torque control amount of a dampening unit (for example, a torsional damper) coupled to the engine, based on the detected gear shift. The torque control amount may relate to an amount of torque for the dampening unit to absorb the torsional vibrations of the engine. In certain cases, the torsional vibrations may change based on the gear shift. In an example, a first gear shift in the transmission unit may allow a minimal speed of the engine, which may eventually generate a minimal vibration based on the minimal speed. In another example, a second gear shift in the transmission unit may allow an increased speed compared to the minimal speed of the engine, which may eventually generate an increased vibration compared to the minimal vibration. In such cases, the disclosed apparatus may detect corresponding gear shift and modify the torque control amount based on the corresponding gear shift of the engine. Therefore, based on a modified torque control amount (such as, a minimal torque control amount for the first gear shift and an increased torque control amount for the second gear shift and the like), it may be easier for the dampening unit to dampen multiple ranges of vibrations of the engine.

The apparatus may further determine a dampening duration of the dampening unit at the detected gear shift. The dampening duration may correspond to a time taken for the dampening unit to absorb torsional vibrations of the engine at the detected gear shift. In certain cases, the dampening unit may take more time than a required dampening time. In such cases, the apparatus may compare the determined dampening duration at the detected gear shift with a preset dampening duration at a preset gear shift. If the dampening duration at the detected gear shift is more than the preset dampening duration at corresponding preset gear shift, the apparatus may control the torque control amount of the dampening unit, such that, the determined dampening duration may be modified to the preset dampening duration at the corresponding gear shift. In an example, the preset dampening duration may be lesser than the determined dampening duration at the detected gear shift. Therefore, based on the modified torque control amount, it may be easier for the dampening unit to absorb the torsional vibrations of the engine at a minimal time compared to the required dampening time.

Reference will now be made in detail to specific aspects or features, examples of which are illustrated in the accompanying drawings. Wherever possible, corresponding or similar reference numbers will be used throughout the drawings to refer to the same or corresponding parts.

Figure 1:
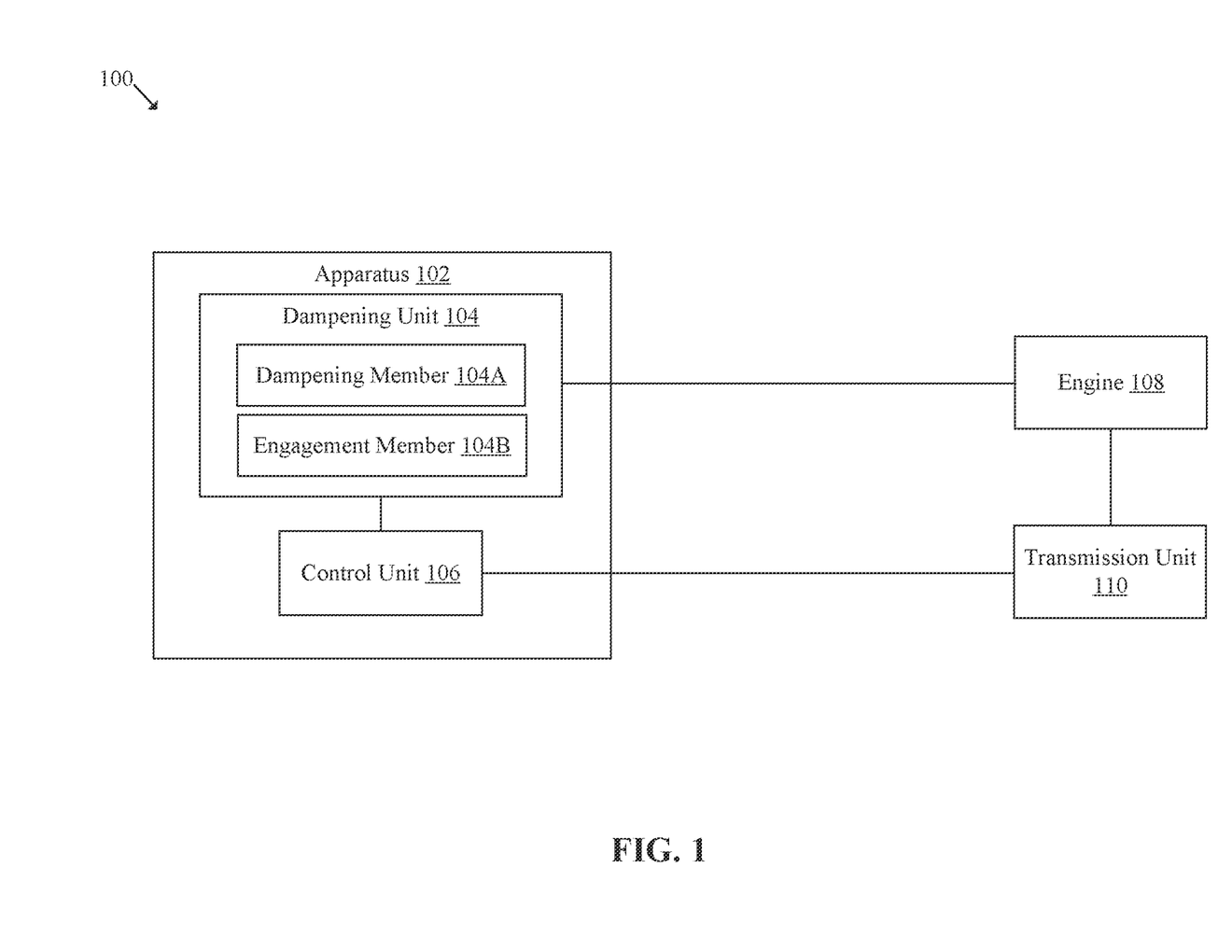
FIG. 1 is a block diagram that illustrates an exemplary network environment of an apparatus to control a torque of a dampening unit based on a gear shift, in accordance with an embodiment of the disclosure.

FIG. 1 is a block diagram that illustrates an exemplary network environment of an apparatus to control a torque of a dampening unit based on a gear shift, in accordance with an embodiment of the disclosure. With reference to FIG. 1, there is shown a network environment 100 of an apparatus 102. The apparatus 102 may include a dampening unit 104 and a control unit 106 communicably coupled to the dampening unit 104. The dampening unit 104 may be coupled to an engine 108. The engine 108 may be associated with a transmission unit 110 that may be configured to control a speed of the engine 108.

The apparatus 102 may be configured to control a torque control amount of the dampening unit 104 (for example, a torsional damper) based on a gear shift (such as a change in a gear of the transmission unit 110 associated with the engine 108). The torque control amount may relate to an amount of torque for the dampening unit 104 that may be required to absorb the torsional vibrations of the engine 108. For example, the apparatus 102 may be an electronic control unit (ECU) that may be integrated in a vehicle (not shown). The ECU may be configured to control the torque control amount of the dampening unit 104 based on the gear shift of the transmission unit 110. Details of the ECU are further described, for example, in FIG. 3. In another example, the apparatus 102 may be a server (not shown) that may be remotely coupled to each dampening unit (such as the dampening unit 104) in each vehicle of a fleet of vehicles. The server may be configured to control the torque control amount of each dampening unit in each vehicle of the fleet of vehicles, based on a gear shift of a transmission unit (such as the transmission unit 110) in corresponding vehicle of the fleet of vehicles.

The server may include suitable logic, circuitry, interfaces, and/or code that may be configured to communicate with each dampening unit (or with corresponding ECU) in each vehicle of the fleet of vehicles to transmit, via a communication network (not shown), control instructions associated with the torque control amount determined based on the gear shift of the transmission unit in corresponding vehicle of the fleet of vehicles. Details of the communication network are further described, for example, in FIG. 3. In an embodiment, the server may be configured to store information associated with a preset dampening duration at a preset gear shift. The server may be further configured to receive information associated with the gear shift and corresponding dampening duration from corresponding vehicle; and compare the received information with the stored information to determine the torque control amount. Based on the determined torque control amount, the server may remotely control each dampening unit in each vehicle of the fleet of vehicles. To remotely control, the server may transmit information about the determined torque control amount to the ECU of the corresponding vehicle of the fleet of vehicles. Therefore, it may be easier to control the engine vibrations in each vehicle of the fleet of vehicles from a single apparatus (i.e., the server).

In an embodiment, the server may be a cloud server, which may be utilized to execute various operations through web applications, cloud applications, HTTP requests, repository operations, file transfer, and the like. Examples of the server may include, but are not limited to, an event server, a database server, a file server, a web server, a media server, a content server, an application server, a mainframe server, or a combination thereof. In one or more embodiments, the server may be implemented as a plurality of distributed cloud-based resources. In an embodiment, the server may be configured to communicate with at least one of: the dampening unit 104, the control unit 106, the engine 108, or the transmission unit 110, to control the torque control amount of the dampening unit 104.

The dampening unit 104 may be configured to be coupled to the engine 108 to absorb vibrations of the engine 108. In an example, the dampening unit 104 may be a torsional damper that may be coupled to the engine 108 to absorb the torsional vibrations of the engine 108. The torsional damper may be coupled to an end of a crankshaft (not shown) of the engine 108 to absorb torsional and resonance-based vibrations from the crankshaft of the engine 108. In another example, the dampening unit 104 may also be a torque damper that may be coupled to the engine 108 to absorb linear vibrations of the engine 108. The torque damper may be coupled to an engine head (not shown) of the engine 108 to absorb linear vibrations of the engine 108. Examples of the dampening unit 104 may include, but not limited to, one of: a mechanical damper, a hydraulic damper, or a harmonic damper. In an embodiment, the dampening unit 104 may include a dampening member 104A and an engagement member 104B as shown, for example, in FIG. 1.

The dampening member 104A may be configured to receive the determined torque control amount from the control unit 106 of the apparatus 102. Based on the received torque control amount, the dampening member 104A may be modified to absorb various vibrations of the engine 108. In an example, the dampening member 104A may be a resilient member (such as a spring in case of torque dampers) that may be modified based on the received torque control amount. In another example, the dampening member 104A may be an elastomeric member (such as a silicone ring in case of harmonic dampers) that may be modified based on the received torque control amount.

The engagement member 104B may be an implement (such as a coupling member) that may facilitate a mechanical connection (such as riveting, screwing, or other fastening process) between the dampening unit 104 and the engine 108. In an example, the engagement member 104B may be a bracket (such as an angular bracket in case of torque dampers) that may be coupled to a part of the engine head of the engine 108. In an example, the bracket may have a substantially L-shaped profile that may conform to a profile of the part of the engine head. The bracket may also have other structural profiles based on the profile of the part of the engine head, such as, but not limited to, a substantially C-shaped profile or a substantially U-shaped profile. Therefore, the engagement member 1046 may facilitate a rigid connection between the dampening unit 104 and the engine 108, such that, the dampening member 104A of the dampening unit 104 may completely absorb the vibrations that may be generated from the engine 108. In another example, the engagement member 104B may be a ring-shaped member (such as a silicone/rubber ring in case of harmonic dampers) that may be coupled to a part of a crank shaft (not shown) of the engine 108.

The control unit 106 may be communicably coupled to the dampening unit 104 to control the torque control amount of the dampening unit 104 to absorb the torsional vibrations of the engine 108. In an embodiment, the control unit 106 may be an electronic control unit (ECU) that may be integrated in a vehicle (not shown). The electronic control unit (ECU) may be configured to control the dampening unit 104 based on the determined torque control amount. In an example, the ECU may be configured to determine the torque control amount of the dampening unit 104 based on the gear shift of the transmission unit 110; and control the dampening unit 104 based on the determined torque control amount. Details of the electronic control unit are further described, for example, in FIG. 3. In another embodiment, the control unit 106 may be a remote-control unit that may be communicably coupled to the vehicle. The remote-control unit may be configured to control the dampening unit 104 based on the determined torque control amount. For example, the control unit 106 may be the server that may be remotely coupled to each dampening unit (such as the dampening unit 104) in each vehicle of the fleet of vehicles.

The engine 108 may be configured to provide power to the vehicle. The engine 108 may be an internal combustion engine, which may be actuated by one of: a spark ignition or a compression ignition. The engine 108 may include various parts, for example, but are not limited to, the engine head, the crankshaft, a piston, a camshaft, a flywheel, etc. The engine 108 may be two-stroke or four-stroke internal combustion engines. The engine 108 may include either one, two, three, four, or six cylinders. In some embodiments, the engine 108 may also include a motor in case of an electric motorcycle. Examples of the engine 108 may include, but are not limited to, an inline engine (i.e. single cylinder, parallel twin, inline-triple, inline-four, inline-six), a V layout engine (i.e. V-twin engine, a V4 engine, a V8 engine), a flat (boxer) engine (i.e. flat-two, flat-four, flat-six), a lawn mower engine, a snow blower engine, or other motorcycle engines known in the art. The description of various parts of the engine 108 has been omitted from the disclosure for the sake of brevity.

The transmission unit 110 may include a plurality of gears that may be configured to releasably engage with each other and shift between each other, to control a speed of the vehicle and a torque of the vehicle. In an example, the transmission unit 110 may have multiple gear ratios (such as a stacked arrangement of gears at a predefined locations in the transmission unit 110) and configured to shift between them based on the speed and the torque requirements of a user of the vehicle. The gear shift may be done manually (by the user) or automatically (by the control unit 106). In an embodiment, the transmission unit 110 may be coupled to the flywheel of the engine 108 and controls the speed or the torque that may be transmitted to wheels of the vehicle. Examples of the transmission unit 110 may include, but not limited to, a manual transmission unit, an automatic transmission unit, a Continuously variable transmission (CVT) unit, or a Semi-automatic and dual-clutch transmission unit.

In operation, the apparatus 102 may detect, via the control unit 106, to detect the gear shift (such as the change in the gear of the transmission unit 110 associated with the engine 108). Based on the detected gear shift, the apparatus 102 may determine, via the control unit 106, the dampening duration of the dampening unit 104 at the detected gear shift. The dampening duration may correspond to the time taken for the dampening unit 104 to absorb torsional vibrations of the engine 108 at the detected gear shift. Based on the determination of the dampening duration, the apparatus 102 may compare, via the control unit 106, the determined dampening duration at the detected gear shift with the preset dampening duration at the preset gear shift. Based on the comparison, the apparatus 102 may determine, via the control unit 106, the torque control amount for the dampening unit 104 to absorb the torsional vibrations of the engine 108 and control the dampening unit 104 based on the determined torque control amount. Details of the torque control amount are further explained, for example, in FIGS. 2A-2C.

Figure 2A:
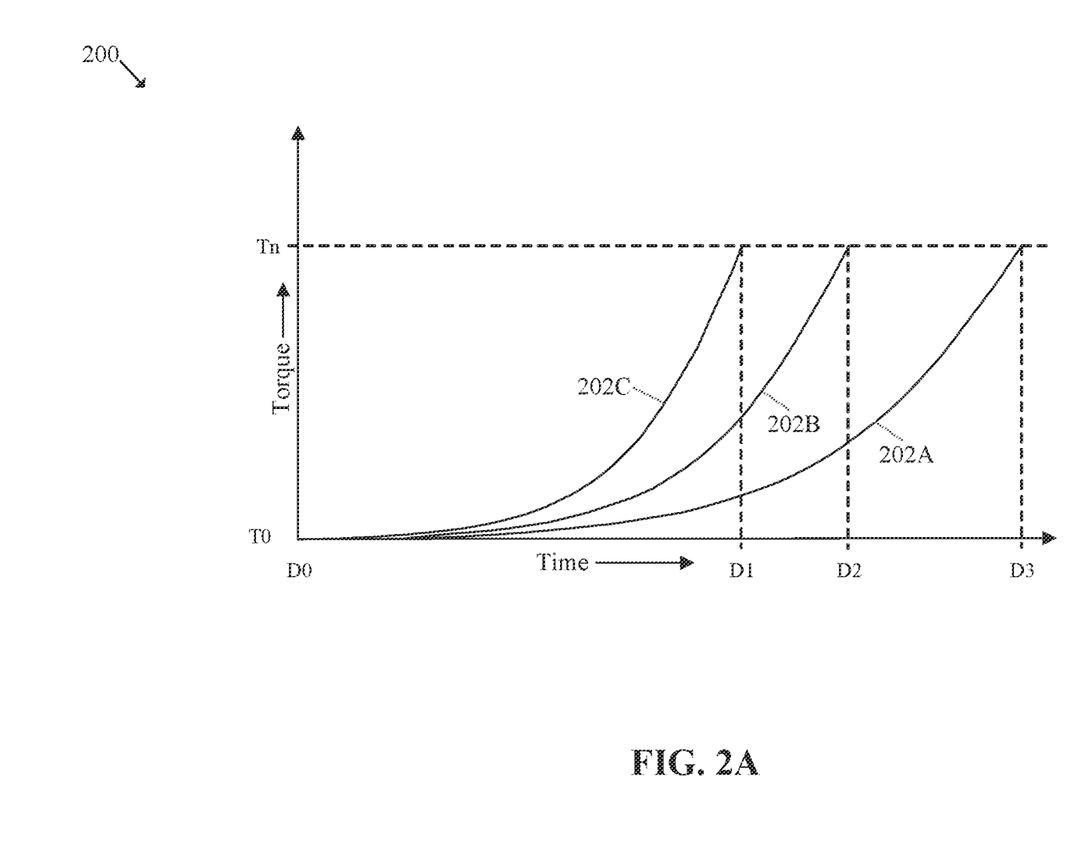
FIGS. 2A-2C are graphs that illustrate an exemplary correlation between a gear shift and a dampening duration of the dampening unit at corresponding gear shift, to control the torque of the dampening unit by the apparatus of FIG. 1, in accordance with an embodiment of the disclosure.
Figure 2B:
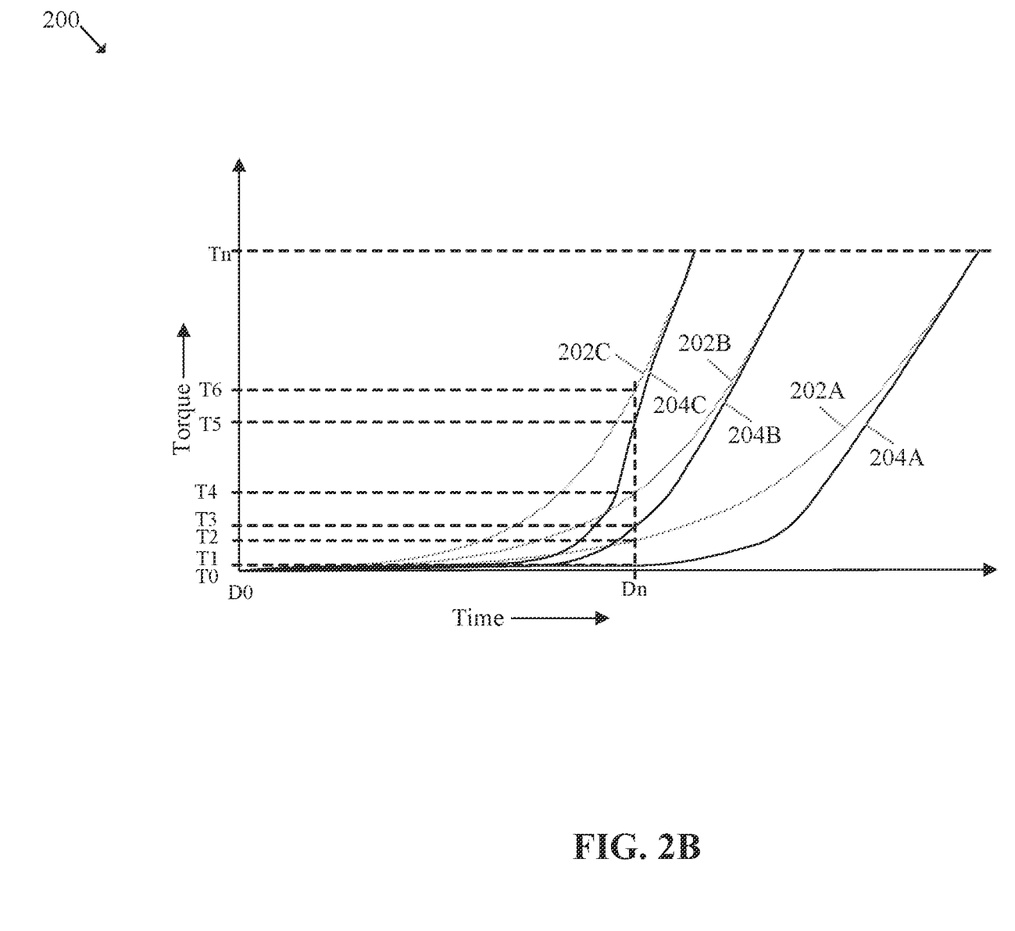
Figure 2C:
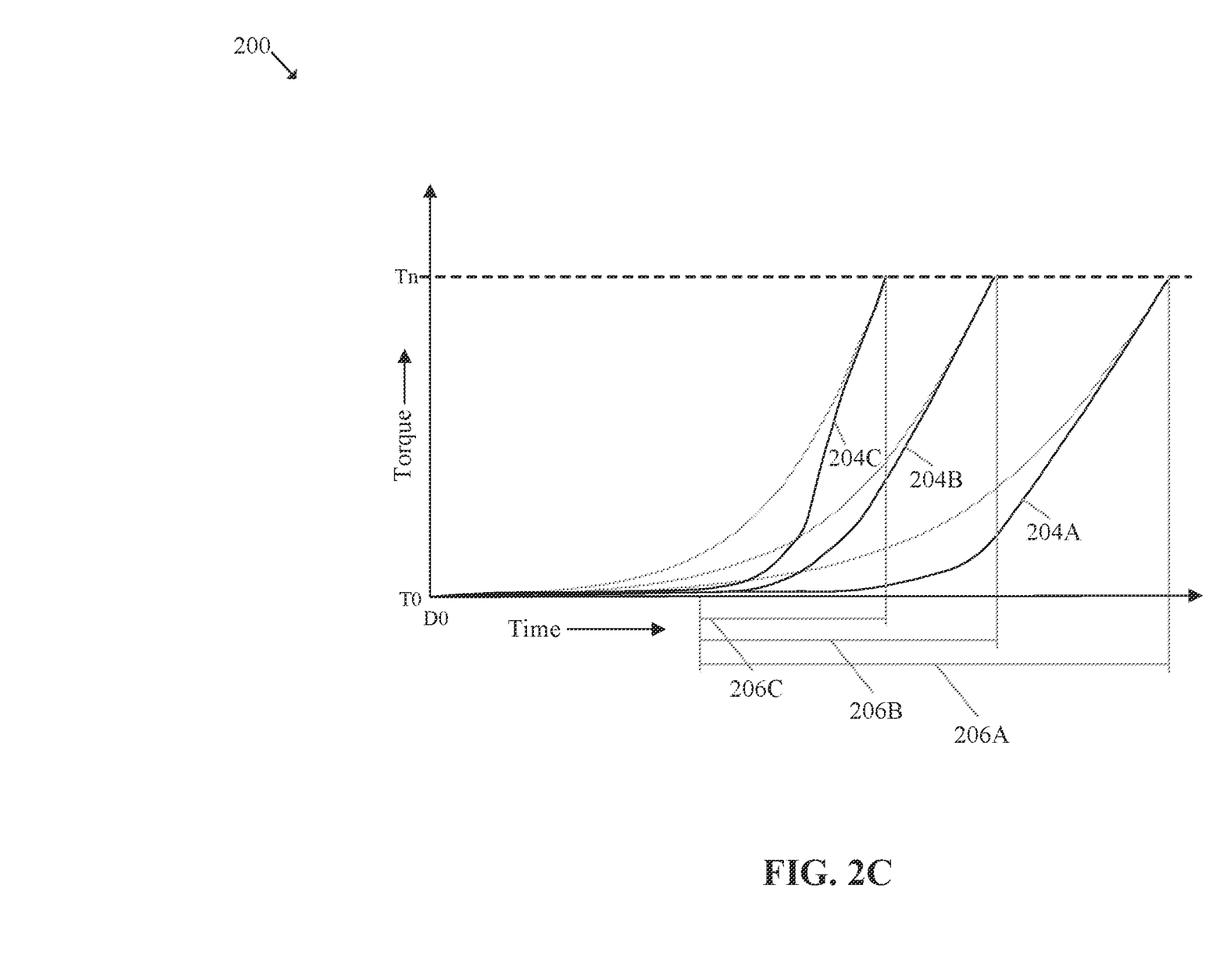

FIGS. 2A-2C are graphs that illustrate an exemplary correlation between a gear shift and a dampening duration of the dampening unit at corresponding gear shift, to control the torque of the dampening unit by the apparatus of FIG. 1, in accordance with an embodiment of the disclosure. FIGS. 2A-2C are explained in conjunction with elements from FIG. 1. With reference to FIGS. 2A-2C, there is shown an initial correlation (as shown in FIG. 2A), a preset torque control correlation (as shown in FIG. 2B), and a preset dampening duration correlation (as shown in FIG. 2C).

Referring to FIG. 2A, there is shown the initial correlation. In the initial correlation, the control unit 106 may generate a first graph based on the determined dampening duration at the detected gear shift. The determined dampening duration corresponds to a first axis (such as an 'X' axis) of the first graph and the detected gear shift corresponds to a second axis (such as a "Y" axis) of the first graph. At each gear shift of the transmission unit 110, there may be a torque control amount that may be set for the dampening unit 104. The torque control amount may correspond to the amount of torque for the dampening unit 104 to absorb the torsional vibrations of the engine 108. For example, the dampening unit 104 may correspond to the torque control amount that ranges between an initial torque control amount (T0) and a target torque control amount (Tn), to absorb the torsional vibrations of the engine 108.

The dampening duration may correspond to the time taken for the dampening unit 104 to absorb the torsional vibrations of the engine 108 at the detected gear shift. For example, the dampening unit 104 may correspond to the dampening duration that ranges between an initial dampening duration (D0) and a terminal dampening duration (D3), to absorb the torsional vibrations of the engine 108. The dampening duration may vary based on the gear shift. For example, in a first gear shift 202A (such as a change in a first gear of the transmission unit 110 associated with the engine 108) of the transmission unit 110, the time taken for the dampening unit 104 may correspond to the terminal dampening duration (D3). In another example, in a second gear shift 202B (such as a change in a second gear of the transmission unit 110 associated with the engine 108) of the transmission unit 110, the time taken for the dampening unit 104 may correspond to a second dampening duration (D2). In yet another example, in a third gear shift 202C (such as a change in a third gear of the transmission unit 110 associated with the engine 108) of the transmission unit 110, the time taken for the dampening unit 104 may correspond to a third dampening duration (D1). In an embodiment, the third gear shift 202C may correspond to a maximum speed (with a minimum torque) of the vehicle that may be higher than a speed of the first gear shift 202A. In such a case, the third dampening duration (D1) for the third gear shift 202C may be lesser than the terminal dampening duration (D3) for the first gear shift 202A. Alternatively, the third dampening duration (D1) for the third gear shift 202C may also be higher than the terminal dampening duration (D3) for the first gear shift 202A, based on user preference (for example, in case the user prefers the dampening of the torsional vibrations of the engine 108 without any abrupt movement in the vehicle, the user may modify the dampening duration).

Referring to FIG. 2B, there is shown the preset torque control correlation. In the preset torque control correlation, the control unit 106 may be configured to generate a second graph based on the preset dampening duration at the preset gear shift. The preset dampening duration corresponds to a first axis (such as an 'X' axis) of the second graph and the preset gear shift corresponds to a second axis (such as a 'Y' axis) of the second graph. At each preset gear shift of the transmission unit 110, there may be a preset torque control amount that may be set for the dampening unit 104. The preset torque control amount may correspond to a preset amount of torque for the dampening unit 104 to optimally absorb the torsional vibrations of the engine 108. For example, the dampening unit 104 may correspond to the preset torque control amount that ranges between an initial torque control amount (T0) and a target torque control amount (Tn), to absorb the torsional vibrations of the engine 108. In an embodiment, the control unit 106 may compare the generated first graph with the generated second graph, to determine the torque control amount for the dampening unit 104 to absorb the torsional vibrations of the engine 108.

Based on the determined torque control amount, the control unit 106 may generate one or more control signals for the dampening unit 104 based on the determined torque control amount. The control unit 106 may further control at least one dampening member (such as the dampening member 104A) of the dampening unit 104 based on the generated one or more control signals, to selectively modify a torque value of the dampening unit 104 based on the detected gear shift and the corresponding dampening duration. For example, in case the control unit 106 determines a first torque control amount (T2) in the first gear shift 202A, the control unit 106 modifies the first torque control amount (T2) to a second torque control amount (T1) based on the comparison with a first preset gear shift 204A. In an embodiment, the first torque control amount (T2) may have a higher torque value compared to the second torque control amount (T1). In another example, in case the control unit 106 determines a third torque control amount (T4) in the second gear shift 202B, the control unit 106 modifies the third torque control amount (T4) to a fourth torque control amount (T3) based on the comparison with a second preset gear shift 204B. In an embodiment, the third torque control amount (T4) may have a higher torque value compared to the fourth torque control amount (T3). In yet another example, in case the control unit 106 determines a fifth torque control amount (T6) in the third gear shift 202C, the control unit 106 modifies the fifth torque control amount (T6) to a sixth torque control amount (T5) based on the comparison with a third preset gear shift 204C. In an embodiment, the fifth torque control amount (T6) may have a higher torque value compared to the sixth torque control amount (T5). Therefore, based on a modified torque control amount (such as, the second torque control amount (T1), the fourth torque control amount (T3) or the sixth torque control amount (T5)), it may be easier for the dampening unit 104 to dampen multiple ranges of vibrations that may have caused based on the gear shift (such as, at the first gear shift 202A, the second gear shift 202B, or the third gear shift 202C of the engine 108.

Referring to FIG. 2C, there is shown a specific emphasis on the preset dampening duration correlation. In certain cases, the dampening unit 104 may take more time than a required dampening time to dampen the torsional vibrations of the engine 108. In such cases, the apparatus 102 may compare the determined dampening duration at the detected gear shift (such as terminal dampening duration (D3) at the first gear shift 202A, the second dampening duration (D2) at the second gear shift 202B, and the third dampening duration (D1) at the third gear shift 202C with the preset dampening duration at the preset gear shift (such as a first preset dampening duration 206A at the first preset gear shift 204A, a second preset dampening duration 206B at the second preset gear shift 204B, and a third preset dampening duration 206C at the third preset gear shift 204C) respectively. If the dampening duration at the detected gear shift is more than the preset dampening duration at corresponding preset gear shift, the control unit 106 may control the torque control amount of the dampening unit 104, such that, the determined dampening duration may be modified to the preset dampening duration at the corresponding gear shift.

In an example, the preset dampening duration at the preset gear shift (such as the second preset dampening duration 206B at the second preset gear shift 204B) may be lesser than the determined dampening duration at the corresponding gear shift (such as the second dampening duration D2 at the second gear shift 202B shown in FIG. 2A). Therefore, based on the modified torque control amount, it may be easier for the dampening unit 104 to absorb the torsional vibrations of the engine 108 at a minimal time compared to the required dampening time.

Figure 3:
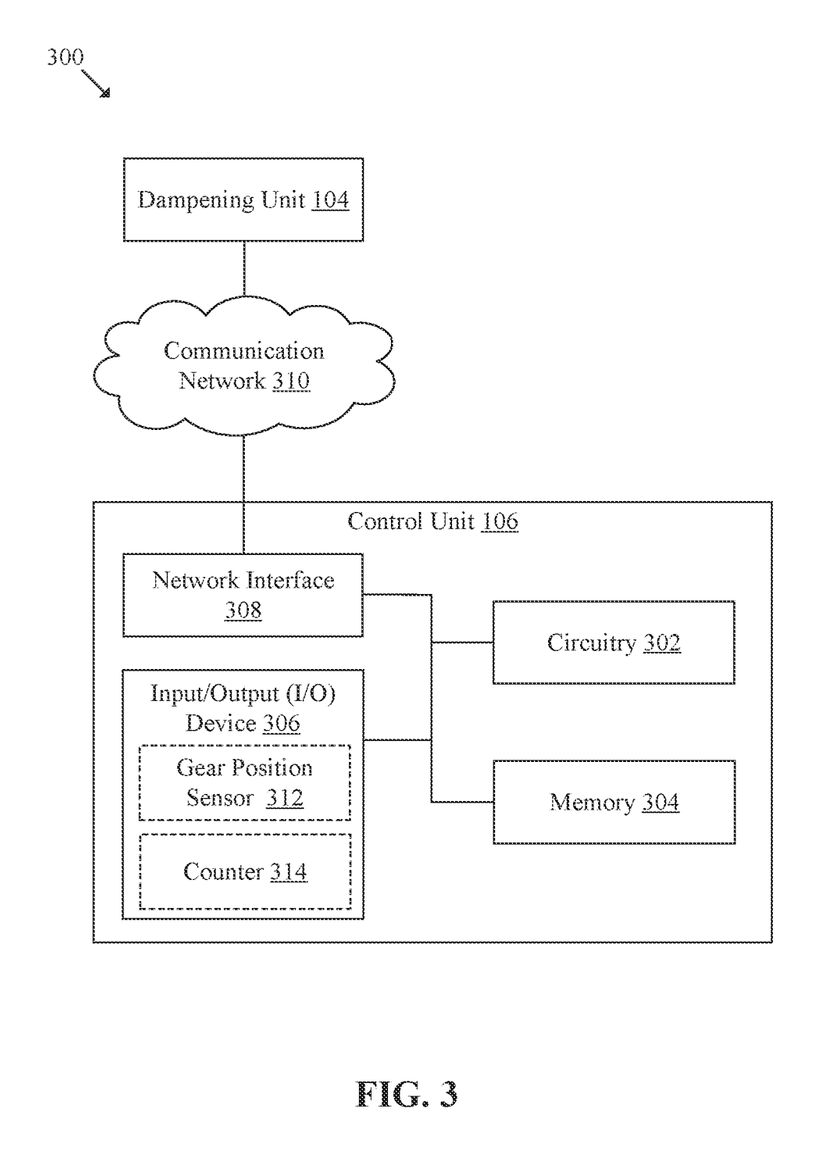
FIG. 3 is a block diagram that illustrates an exemplary apparatus, in accordance with an embodiment of the disclosure.

FIG. 3 is a block diagram that illustrates an exemplary apparatus, in accordance with an embodiment of the disclosure. FIG. 3 is explained in conjunction with elements from FIG. 1 and FIGS. 2A-2C. With reference to FIG. 3, there is shown a block diagram 300 of the control unit 106 of the apparatus 102. The control unit 106 may include circuitry 302, a memory 304, a I/O device 306, a network interface 308, and a communication network 310. In an embodiment, the control unit 106 may be communicably coupled to a gear position sensor 312 of the vehicle, and a counter 314 associated with the vehicle, via the communication network 310.

The circuitry 302 may include suitable logic, circuitry, and/or interfaces that may be configured to execute program instructions associated with different operations to be executed by the apparatus 102. For example, some of the operations may include, but are not limited to, detection of the gear shift in the transmission unit 110 associated with the engine 108, determination of the dampening duration of the dampening unit 104 at the detected gear shift, comparison of the determined dampening duration at the detected gear shift with the preset dampening duration at the preset gear shift, determination of a torque control amount for the dampening unit 104 to absorb the torsional vibrations of the engine 108, and control of the dampening unit 104 based on the determined torque control amount. The executions of operations are further described, for example, in FIGS. 2A-2C.

The circuitry 302 may include any suitable special-purpose or general-purpose computer, computing entity, or processing device including various computer hardware or software modules and may be configured to execute instructions stored on any applicable computer-readable storage media (for example, the memory 304). The circuitry 302 may be implemented based on several processor technologies known in the art. For example, the circuitry 302 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. The circuitry 302 may include any number of processors that may be configured to, individually or collectively, perform any number of operations of the apparatus 102, as described in the present disclosure. Examples of the apparatus 102 may include a Central Processing Unit (CPU), a Graphical Processing Unit (GPU), an x86-based processor, an x64-based processor, a Reduced Instruction Set Computing (RISC) processor, a Complex Instruction Set Computing (CISC) processor, and/or other hardware processors.

The memory 304 may include suitable logic, circuitry, interfaces, and/or code that may be configured to store the set of instructions executable by the circuitry 302. In an embodiment, the memory 304 may be configured to store information associated with the gear shift in the transmission unit 110, information associated with the determined dampening duration at the determined gear shift, information associated with the preset dampening duration at the preset gear shift, information associated with the torque control amount for the dampening unit 104, and information associated with at least one of: an acceleration pedal amount percentage, an engine speed, a vehicle speed, an ambient air pressure, or other dampers associated with the dampening unit 104. Examples of implementation of the memory 304 may include, but are not limited to, Random Access Memory (RAM), Read Only Memory (ROM), Hard Disk Drive (HDD), a Solid-State Drive (SSD), a CPU cache, and/or a Secure Digital (SD) card.

The I/O device 306 may include suitable logic, circuitry, interfaces, and/or code that may be configured to receive information associated with the gear shift and the dampening duration of the dampening unit 104 at corresponding gear shift. In an embodiment, the I/O device 306 may be integrally coupled to the apparatus 102 to receive the information associated with the gear shift and the dampening duration. In another embodiment, the I/O device 306 may be communicably coupled to the apparatus 102 to receive the information associated with the gear shift and the dampening duration. In some embodiments, the I/O device 306 may include the gear position sensor 312 and the counter 314. In some embodiments, the I/O device 306 may include the gear position sensor 312 and the counter 314.

The gear position sensor 312 may include suitable logic, circuitry, and interfaces that may be configured to detect a position of one or more gears in the transmission unit 110 and determine the gear shift in the transmission unit 110. In an embodiment; the gear position sensor 312 may include a detection element (not shown) that may be configured to detect a movement and corresponding position of one or more gears disposed in the transmission unit 110 to determine the gear shift in the transmission unit 110. Examples of the gear position sensor 312 may include, but not limited to, a magnetic sensor, a proximity sensor, or an optical sensor.

The counter 314 may include suitable logic, circuitry, and interfaces that may be configured to determine information associated with the dampening duration of the dampening unit 104 at the detected gear shift. In an example, the counter 314 may include an electronic counter or clock that initiates a countdown based on a reception of torsional vibrations on the dampening unit 104. Based on the countdown of the electronic counter or clock, the control unit 106 may determine information associated with the dampening duration of the dampening unit 104 at the detected gear shift. Examples of the counter 314 may include, but are not limited to, a software timer, a digital clock, or an internal clock associated with the apparatus 102. In another embodiment, the counter 314 may be a mechanical counter that initiates a countdown based on a reception of the torsional vibrations on the dampening unit 104. Based on the countdown of the mechanical counter, the control unit 106 may determine information associated with the dampening duration of the dampening unit 104 at the detected gear shift. In other embodiment, the I/O device 306 may include various input and output devices that may be configured to communicate with the circuitry 302. Examples of such input and output devices may include, but are not limited to, a touch screen, a touch pad, a keyboard, a mouse, a joystick, a microphone, a display device, a speaker, an infotainment system, or an image sensor.

The network interface 308 may include suitable logic, circuitry, and interfaces that may be configured to facilitate communication between the circuitry 302 and other devices (such as the dampening unit 104), via the communication network 310. The network interface 308 may be implemented by use of various technologies to support wired or wireless communication of the apparatus 102 with the communication network 310. The network interface 308 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 308 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The communication network 310 may include a communication medium through which the control unit 106 of the apparatus 102 may communicate with other devices (such as the dampening unit 104, the gear position sensor 312, or the counter 314). The communication network 310 may be one of: a wired connection or a wireless connection. Examples of the communication network 310 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 310 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In an embodiment, the communication network 310 may be an in-vehicle network that may include a medium through which the various control units, components, and/or systems of the vehicle may communicate with each other. In accordance with an embodiment, in-vehicle communication of audio/video data may occur by use of Media Oriented Systems Transport (MOST) multimedia network protocol of the in-vehicle network or other suitable network protocols for vehicle communication. The MOST-based network may be a separate network from the controller area network (CAN). The MOST-based network may use a plastic optical fibre (POF) medium. In accordance with an embodiment, the MOST-based network, the CAN, and other in-vehicle networks may co-exist in a vehicle, such as the vehicle. The in-vehicle network may facilitate access control and/or communication between the control unit 106 and other ECUs, such as ECM or a telematics control unit (TCU) of the vehicle.

Various devices or components in the vehicle may connect to the in-vehicle network, in accordance with various wired and wireless communication protocols. Examples of the wired and wireless communication protocols for the in-vehicle network may include, but are not limited to, a vehicle area network (VAN), a CAN bus, Domestic Digital Bus (D2B), Time-Triggered Protocol (TTP), FlexRay, IEEE 1394, Carrier Sense Multiple Access With Collision Detection (CSMA/CD) based data communication protocol, Inter-Integrated Circuit ($I^2C$), Inter Equipment Bus (IEBus), Society of Automotive Engineers (SAE) J1708, SAE J1939, International Organization for Standardization (ISO) 11992, ISO 11783, Media Oriented Systems Transport (MOST), MOST25, MOST50, MOST150, Plastic optical fibre (POF), Power-line communication (PLC), Serial Peripheral Interface (SPI) bus, and/or Local Interconnect Network (LIN).

In operation, the control unit 106, via the circuitry 302, may control the gear position sensor 312 to detect information associated with the gear shift in the transmission unit 110. The gear shift may correspond to a change of gear in the transmission unit 110. Based on the detection of the gear shift, the control unit 106 may control the counter 314 to determine information associated with the dampening duration of the dampening unit 104 at the detected gear shift. Based on the determination of the dampening duration at the detected gear shift, the control unit 106 may compare at least one of: the detected information associated with the gear shift with information associated with the preset gear shift; or may compare the determined information associated with the dampening duration with information associated with the preset dampening duration, to determine the torque control amount for the dampening unit 104. Based on the determination of the torque control amount, the control unit 106 may control the dampening unit 104 to absorb the torsional vibrations of the engine 108. Further, other functions or operations executed by the apparatus 102, as described in FIG. 1, may also be performed by the circuitry 302 of the control unit 106. A person of ordinary skill in the art will understand that the control unit 106 of the apparatus 102 may also include other suitable components or systems, in addition to the components or systems which are illustrated. A detailed description for the other components or systems of the control unit 106 of the apparatus 102 has been omitted from the disclosure for the sake of brevity.

Figure 4:
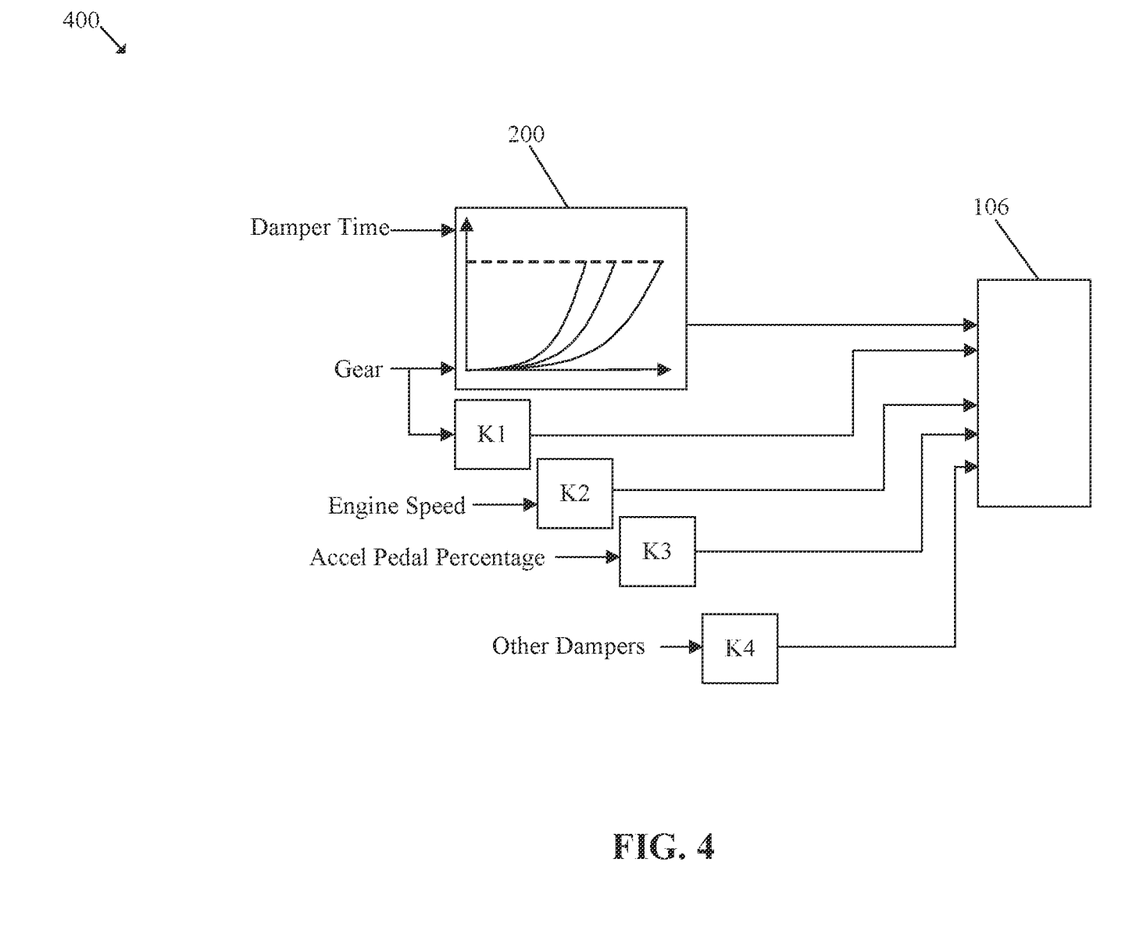
FIG. 4 is a block diagram that illustrates a plurality of control parameters associated with the dampening unit of the apparatus of FIG. 1, in accordance with an embodiment of the disclosure.

FIG. 4 is a block diagram that illustrates a plurality of control parameters associated with the dampening unit of the apparatus of FIG. 1, in accordance with an embodiment of the disclosure. FIG. 4 is explained in conjunction with elements from FIGS. 1, 2A-2C, and 3. With reference to FIG. 4, there is shown an exemplary block diagram 400 that illustrates a plurality of control parameters (K1-K4) associated with the dampening unit 104 for the control unit 106 of the apparatus 102.

In an embodiment, the control unit 106 may be configured to determine the plurality of control parameters associated with the dampening unit 104. The plurality of control parameters may include information associated with one at least of: an acceleration pedal amount percentage (such as an amount of acceleration of the vehicle), an engine speed (such as a current speed of the engine 108), a vehicle speed (such as a current speed of the vehicle), an ambient air pressure (such as a pressure of an environmental associated with the dampening unit 104), or other dampers (such as shock absorbers that may be disposed adjacent to the dampening unit 104 or the engine 108) associated with the dampening unit 104 as shown, for example, in FIG. 4.

In operation, the control unit 106 may detect the gear shift in the transmission unit 110 associated with the engine 108. For example, the control unit 106 may control the gear position sensor 312 to detect the gear shift in the transmission unit 110 associated with the engine 108. Based on the detection of the gear shift, the control unit 106 may determine the dampening duration of the dampening unit 104 at the detected gear shift. The dampening duration may correspond to the time taken for the dampening unit to absorb the torsional vibrations of the engine 108 at the detected gear shift. In an example, the control unit 106 may control the counter 314 to determine the dampening duration of the dampening unit 104 at the detected gear shift and the plurality of control parameters associated with the dampening unit 104. Based on the determination of the dampening duration, the control unit 106 may compare, via the circuitry 302, the determined dampening duration at the detected gear shift with the preset dampening duration at the preset gear shift. Based on the comparison and the determined plurality of control parameters, the control unit 106 may determine the torque control amount for the dampening unit to absorb the torsional vibrations of the engine 108. The control unit 106 may further control the dampening unit 104 based on the determined torque control amount. In an embodiment, the control unit 106 may modify the torque control amount for the dampening unit based on the determined plurality of control parameters and control the dampening unit based on the modified torque control amount. The modified torque control amount may cause an optimal dampening duration (such as a minimal dampening duration) compared to the determined torque control amount, for each gear shift in the transmission unit 110.

Figure 5:
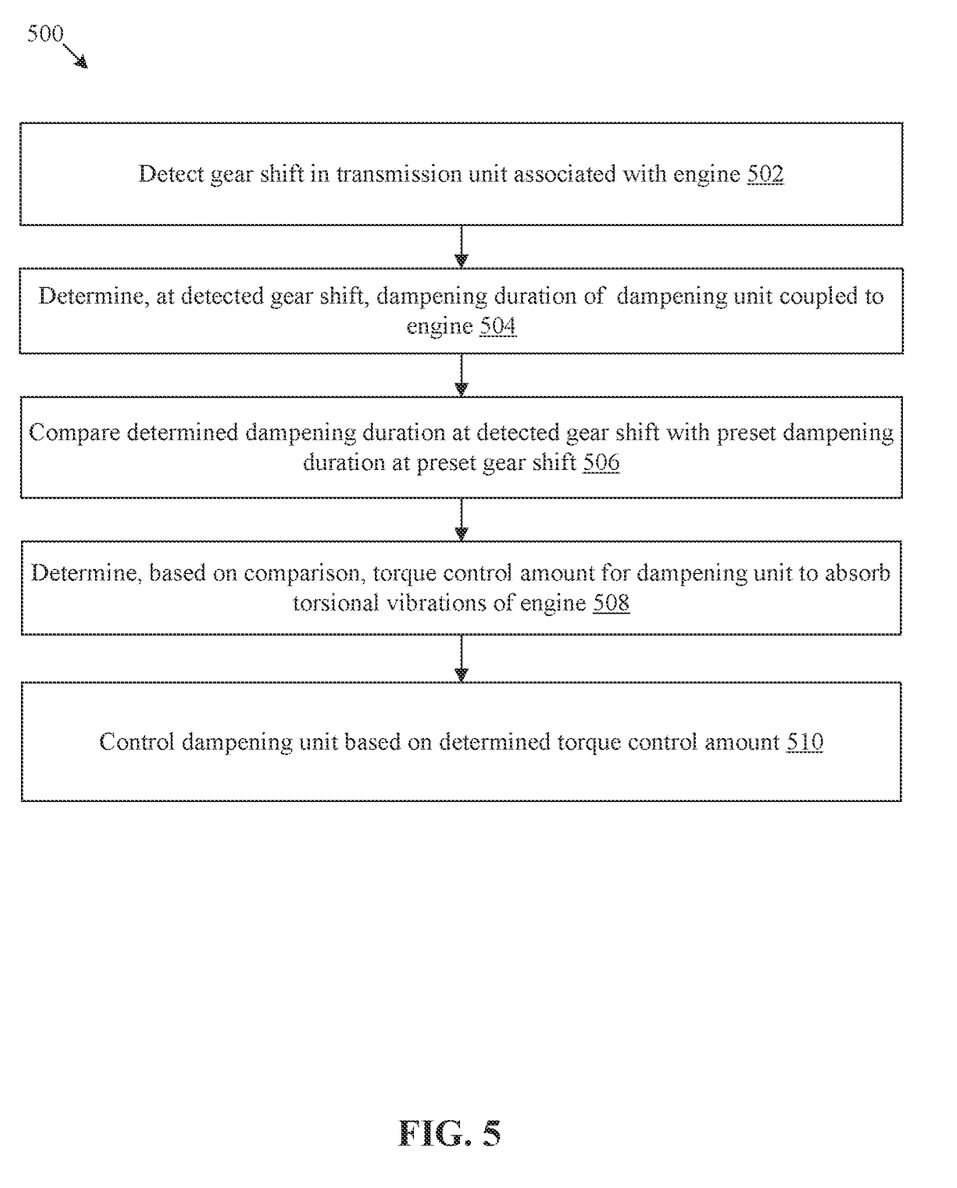
FIG. 5 is a flowchart that illustrates an exemplary method for controlling the torque of the dampening unit based on the gear shift by the apparatus of FIG. 1, in accordance with an embodiment of the disclosure.

FIG. 5 is a flowchart that illustrates an exemplary method for controlling the torque of the dampening unit based on the gear shift by the apparatus of FIG. 1, in accordance with an embodiment of the disclosure. FIG. 5 is explained in conjunction with elements from FIGS. 1, 2A-2C, 3, and 4. With reference to FIG. 5, there is shown a flowchart 500 that depicts a method for controlling the torque of the dampening unit 104 unit based on the gear shift by the control unit 106 of the apparatus 102. The method may be performed by at least one of: the apparatus 102, the control unit 106 of the apparatus 102, or the circuitry 302 of the control unit 106. The method illustrated in the flowchart 500 may start from 502.

At 502, the gear shift in the transmission unit 110 associated with the engine 108 may be detected. In an embodiment, the control unit 106 of the apparatus 102 may detect, via the gear position sensor 312, the gear shift in the transmission unit 110 associated with the engine 108 as described, for example, in FIGS. 1, 2A-2C, and 3.

At 504, the dampening duration of the dampening unit 104 coupled to the engine 108 may be determined. In an embodiment, the control unit 106 of the apparatus 102 may determine, via the counter 314, the dampening duration of the dampening unit 104 coupled to the engine 108 as described, for example, in FIGS. 1, 2A-2C, and 3.

At 506, the determined dampening duration at the detected gear shift may be compared with the preset dampening duration at the preset gear shift. In an embodiment, the control unit 106 of the apparatus 102 may compare the determined dampening duration at the detected gear shift with the preset dampening duration at the preset gear shift as described, for example, in FIGS. 1, 2A-2C and 3.

At 508, the torque control amount may be determined for the dampening unit 104, based on the comparison, to absorb the torsional vibrations of the engine 108. In an embodiment, the control unit of the apparatus 102 may determine the torque control amount for the dampening unit 104 based on the comparison, to absorb the torsional vibrations of the engine 108 as described, for example, in FIGS. 1, 2A-2C, and 3.

At 510, the dampening unit 104 may be controlled based on the determined torque control amount. In an embodiment, the control unit 106 of the apparatus 102 may control the dampening unit 104 based on the determined torque control amount as described, for example, in FIGS. 1, 2A-2C, 3 and 4. Control may pass to an end.

The flowchart 500 is illustrated as discrete operations, such as 502, 504, 506, 508, and 510. However, in certain embodiments, such discrete operations may be further divided into additional operations, combined into fewer operations, or eliminated, or rearranged depending on the implementation without detracting from the essence of the disclosed embodiments.

Various embodiments of the disclosure may provide a non-transitory, computer-readable medium and/or storage medium, and/or a non-transitory machine readable medium and/or storage medium stored thereon, a set of instructions executable by a machine and/or a computer (for example the apparatus 102) to control the torque control amount of a dampening unit (such as the dampening unit 104) based on a gear shift in a transmission unit (such as the transmission unit 110). The set of instructions may be executable by the machine and/or the computer (for example, the apparatus 102 or the circuitry 302) to perform operations that may include, but are not limited to, detection of the gear shift in the transmission unit 110 associated with an engine (such as the engine 108), determination of a dampening duration of the dampening unit 104 at the detected gear shift, comparison of the determined dampening duration at the detected gear shift with a preset dampening duration at a preset gear shift, determination, based on the comparison, of a torque control amount for the dampening unit to absorb the torsional vibrations of the engine, and control of the dampening unit based on the determined torque control amount. The executions of operations are further described, for example, in FIGS. 2A-2C.

For the purposes of the present disclosure, expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural. Further, all joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

The foregoing description of embodiments and examples has been presented for purposes of illustration and description. It is not intended to be exhaustive or limiting to the forms described. Numerous modifications are possible considering the above teachings. Some of those modifications have been discussed and others will be understood by those skilled in the art. The embodiments were chosen and described for illustration of various embodiments. The scope is, of course, not limited to the examples or embodiments set forth herein but can be employed in any number of applications and equivalent devices by those of ordinary skill in the art. Rather it is hereby intended the scope be defined by the claims appended hereto. Additionally, the features of various implementing embodiments may be combined to form further embodiments.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a situation or material to the teachings of the present disclosure without departing from its scope. Therefore, it is intended that the present disclosure is not limited to the embodiment disclosed, but that the present disclosure will include all embodiments that fall within the scope of the appended claims.

What is claimed is:

1. An apparatus, comprising:
    a dampening unit coupled to an engine; and
    a control unit communicably coupled to the dampening unit, wherein the control unit is configured to:
        detect a gear shift in a transmission unit associated with the engine,
        determine a dampening duration of the dampening unit at the detected gear shift, wherein the dampening duration corresponds to a time taken for the dampening unit to absorb torsional vibrations of the engine at the detected gear shift,
        compare the determined dampening duration at the detected gear shift with a preset dampening duration at a preset gear shift,
        determine, based on the comparison, a torque control amount for the dampening unit to absorb the torsional vibrations of the engine, and
        control the dampening unit based on the determined torque control amount.

2. The apparatus according to claim 1, wherein the dampening unit is one of: a mechanical damper, a hydraulic damper, or a harmonic damper, and wherein the dampening unit comprises at least one dampening member to receive the determined torque control amount from the control unit.

3. The apparatus according to claim 1, wherein the dampening unit comprises at least one engagement member to couple with the engine, and wherein the engagement member is coupled to one of: a part of an engine head of the engine or a part of a crank shaft of the engine.

4. The apparatus according to claim 1, wherein the control unit is an electronic control unit (ECU) integrated in a vehicle, and wherein the electronic control unit (ECU) is configured to control the dampening unit based on the determined torque control amount.

5. The apparatus according to claim 1, wherein the control unit is a remote-control unit communicably coupled to a vehicle, and wherein the remote-control unit is configured to control the dampening unit based on the determined torque control amount.

6. The apparatus according to claim 1, wherein the control unit is communicably coupled with a gear position sensor of a vehicle, the control unit is further configured to:
    control the gear position sensor to detect information associated with the gear shift in the transmission unit, wherein the gear shift corresponds to a change of gear in the transmission unit;
    compare the detected information associated with the gear shift with information associated with the preset gear shift, to determine the torque control amount for the dampening unit; and
    control the dampening unit based on the determined torque control amount.

7. The apparatus according to claim 6, wherein the gear position sensor is one of: a magnetic sensor, a proximity sensor, or an optical sensor.

8. The apparatus according to claim 1, wherein the control unit is communicably coupled with a counter associated with a vehicle, the control unit is further configured to:
    control the counter to determine information associated with the dampening duration of the dampening unit at the detected gear shift;
    compare the determined information associated with the dampening duration with information associated with the preset dampening duration, to determine the torque control amount for the dampening unit; and
    control the dampening unit based on the determined torque control amount.

9. The apparatus according to claim 8, wherein the counter is one of: an electronic counter, or a mechanical counter.

10. The apparatus according to claim 1, wherein the control unit is further configured to:
    generate a first graph based on the determined dampening duration at the detected gear shift, wherein the determined dampening duration corresponds to a first axis of the first graph and the detected gear shift corresponds to a second axis of the first graph;
    generate a second graph based on the preset dampening duration at the preset gear shift, wherein the preset dampening duration corresponds to a first axis of the second graph and the preset gear shift corresponds to a second axis of the second graph;
    compare the generated first graph with the generated second graph; and
    determine, based on the comparison, the torque control amount for the dampening unit to absorb the torsional vibrations of the engine.

11. The apparatus according to claim 1, wherein the control unit is further configured to:

generate one or more control signals for the dampening unit based on the determined torque control amount; and control, based on the generated one or more control signals, at least one dampening member of the dampening unit, to selectively modify a torque value of the dampening unit based on the detected gear shift and the corresponding dampening duration.

12. The apparatus according to claim 1, wherein the control unit is further configured to determine a plurality of control parameters associated with the dampening unit;

modify the torque control amount for the dampening unit based on the determined plurality of control parameters; and control the dampening unit based on the modified torque control amount.

13. The apparatus according to claim 12, wherein the plurality of control parameters comprises information associated with at least one of: an acceleration pedal amount percentage, an engine speed, a vehicle speed, an ambient air pressure, or other dampers associated with the dampening unit.

14. An apparatus, comprising:

a dampening unit coupled to an engine; and a control unit communicably coupled to the dampening unit, wherein the control unit is configured to:

detect a gear shift in a transmission unit associated with the engine, determine a dampening duration of the dampening unit at the detected gear shift, wherein the dampening duration corresponds to a time taken for the dampening unit to absorb torsional vibrations of the engine at the detected gear shift, compare the determined dampening duration at the detected gear shift with a preset dampening duration at a preset gear shift, determine a plurality of control parameters associated with the dampening unit, determine, based on the comparison and the determined plurality of control parameters, a torque control amount for the dampening unit to absorb the torsional vibrations of the engine, and control the dampening unit based on the determined torque control amount.

15. The apparatus according to claim 14, wherein the plurality of control parameters comprises information associated with one at least of: an acceleration pedal amount percentage, an engine speed, a vehicle speed, an ambient air pressure, or other dampers associated with the dampening unit.

16. The apparatus according to claim 14, wherein the control unit is communicably coupled with a gear position sensor of a vehicle, the control unit is further configured to:

control the gear position sensor to detect information associated with the gear shift in the transmission unit, wherein the gear shift corresponds to a change of gear in the transmission unit;

compare the detected information associated with the gear shift with information associated with the preset gear shift, to determine the torque control amount for the dampening unit; and control the dampening unit based on the determined torque control amount.

17. The apparatus according to claim 16, wherein the gear position sensor is one of: a magnetic sensor, a proximity sensor, or an optical sensor.

18. The apparatus according to claim 14, wherein the control unit is communicably coupled with a counter associated with a vehicle, the control unit is further configured to:

control the counter to determine information associated with the dampening duration of the dampening unit at the detected gear shift;

compare the determined information associated with the dampening duration with information associated with the preset dampening duration, to determine the torque control amount for the dampening unit; and control the dampening unit based on the determined torque control amount.

19. The apparatus according to claim 18, wherein the counter is one of: an electronic counter, or a mechanical counter.

20. A method, comprising:

in a control unit:

detecting a gear shift in a transmission unit associated with an engine, determining, at the detected gear shift, a dampening duration of a dampening unit coupled to the engine, wherein the dampening duration corresponds to a time taken for the dampening unit to absorb torsional vibrations of the engine at the detected gear shift, comparing the determined dampening duration at the detected gear shift with a preset dampening duration at a preset gear shift, determining, based on the comparison, a torque control amount for the dampening unit to absorb the torsional vibrations of the engine, and controlling the dampening unit based on the determined torque control amount.

* * * * *